O. P. MARCONET AND W. O. CARTER.
SHEET GLASS DRAWING MACHINE.
APPLICATION FILED MAR. 19, 1920.

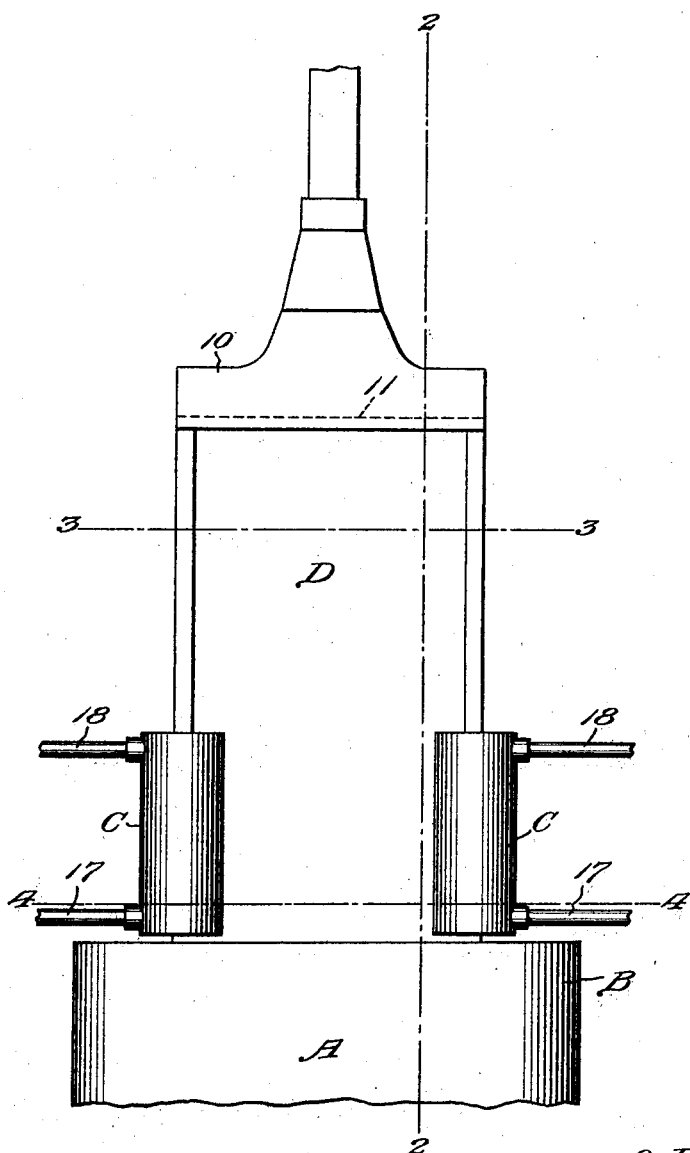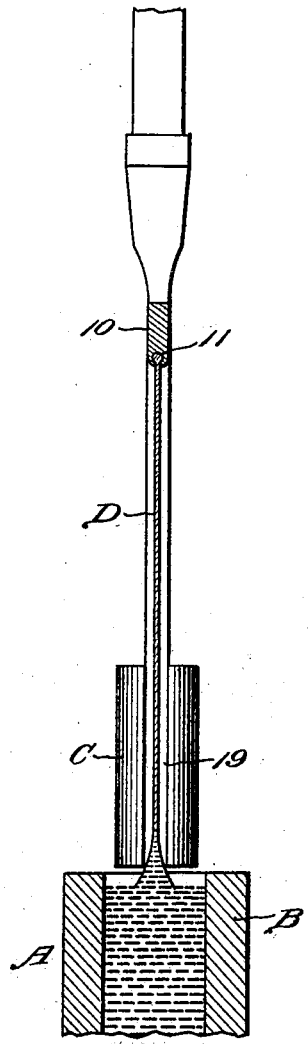

1,398,109.

Patented Nov. 22, 1921.

O. P. Marconet
W. O. Carter INVENTORS

BY Victor J. Evans

ATTORNEY

WITNESS:
Edwin F. McKee
Edward Yeager

UNITED STATES PATENT OFFICE.

ORLAN P. MARCONET AND WILLIAM O. CARTER, OF CLARKSBURG, WEST VIRGINIA.

SHEET-GLASS-DRAWING MACHINE.

1,398,109.  Specification of Letters Patent.  Patented Nov. 22, 1921.

Application filed March 19, 1920. Serial No. 367,200.

*To all whom it may concern:*

Be it known that ORLAN P. MARCONET and WILLIAM O. CARTER, citizens of the United States, residing at Clarksburg, in the county of Harrison and State of West Virginia, respectively, have invented new and useful Improvements in Sheet-Glass-Drawing Machines, of which the following is a specification.

This invention relates to machines for manufacturing glass.

In machines of this character, the glass is usually brought from the furnace in the form of cylinders, which subsequently are subjected to a flattening process before they can be made into sheets. This not only requires considerable time, but also considerable labor, both of which elements can be dispensed with by use of the present invention.

The chief characteristic of this invention resides in the provision of means to preserve straightness and uniformity in width of the glass as it is drawn from the furnace thus producing a sheet of rectangular formation.

To this end, the invention makes use of a plurality of cooling devices arranged at opposite sides of the furnace and through which the longitudinal edges of the sheet of glass pass while being drawn from the furnace. The edges are cooled and hardened as the sheet is drawn outward from the furnace, the edges being also thickened so that the sheet glass lying between the edges is afforded straightness and uniformity in width.

The nature and advantages of the invention will be better understood when the following detail description is read in connection with the accompanying drawings, the invention residing in the construction, combination and arrangement of parts as claimed.

In the drawings forming part of this application, like numerals of reference indicate similar parts in the several views and wherein:—

Figure 1 is a fragmentary view in elevation of a furnace showing the cooling devices associated therewith and a sheet of glass partly withdrawn from the furnace.

Fig. 2 is a sectional view taken on the line 2—2 of Fig. 1.

Figure 3:
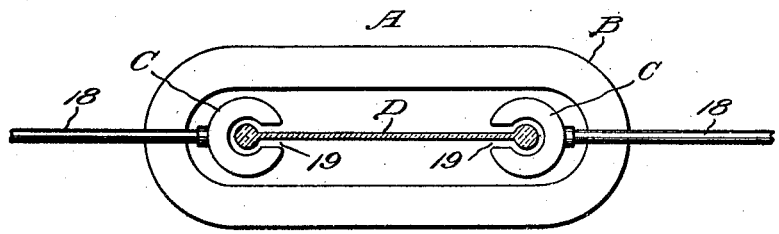
Fig. 3 is a transverse sectional view taken on the line 3—3 of Fig. 1.
Figure 4:
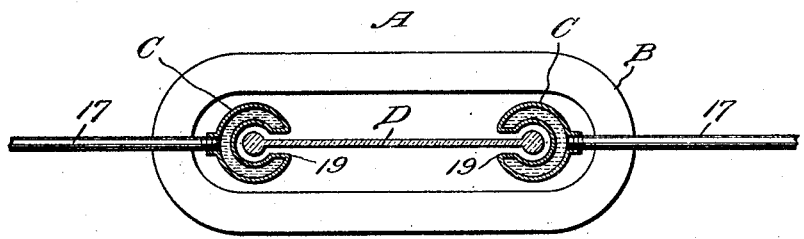
Fig. 4 is a similar view taken on the line 4—4 of Fig. 1.
Figure 6:
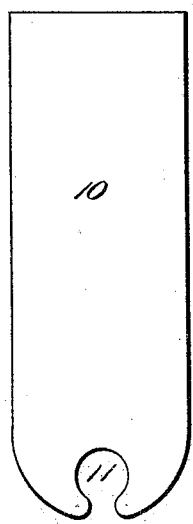
Fig. 6 is a view of the bait.
Figure 7:
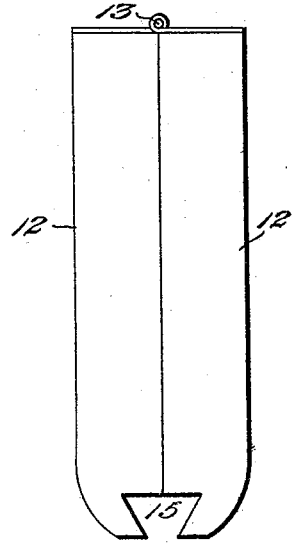
Fig. 7 is a similar view of a modified form.
Figure 5:
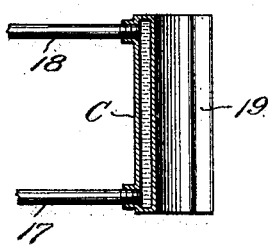
Fig. 5 is a detail view of one of the cooling devices.

Referring to the drawings in detal, A indicates generally a furnace including the clay ring indicated at B. The bait for grasping the molten glass to withdraw the same from the furnace is indicated at 10, this bait being associated with the usual pipe lifting machinery (not shown). The bait indicated at 10 may be formed of a single element having a groove in its lower edge as at 11 of semi-cylindrical formation, or the bait may be of the form shown in Fig. 7, wherein it is made up of two identically constructed sections 12 hingedly connected together as at 13. In this form of the invention, the groove 15 defined by the respective sections is of substantially dovetailed formation.

In accordance with the present invention, cooling devices of any suitable character are arranged at opposite sides of the furnace within the clay ring B, these devices being indicated generally at C and of a construction to receive the opposed longitudinal edges of the sheet of glass D, as the latter is brought from the furnace. The purpose of these cooling devices, is to cool and harden the opposed longitudinal edges of the sheet of glass prior to the cooling and hardening of that part of the glass sheet lying between the edges, the hardened edges preserving straightness and uniformity in width until the entire sheet is drawn from the furnace. Consequently the glass is manufactured in rectangular sheets as it is brought from the furnace, thus eliminating the necessity of subjecting the glass brought from the furnace to a flattening process as is customary in machines of this character.

The cooling devices as shown in this specific instance are in the form of water jackets, each being equipped with a water inlet 17 and a water outlet indicated at 18. The water jackets are preferably of cylindrical formation in cross section, hollow and provided with a longitudinal slot 19 extended throughout the entire length of the jacket. The jacket may however vary in cross sectional configuration without departing from the spirit of the invention.

In practice, the bait is lowered to grasp the molten glass and subsequently elevated in the usual manner to lift the glass from the furnace. As the glass leaves the furnace, the opposed edges thereof enter the slots 19 of the respective water jackets, and pass through the jackets as the sheet of glass is elevated. The longitudinal edges of the sheet of glass are thus cooled and hardened prior to the cooling and hardening of the glass lying between the edges, the latter being also given a cross sectional configuration similar to that of the water jackets through which they pass. Consequently the edges of the sheet are made relatively thick as compared to the glass lying between the edges, and serve to preserve uniform width of the sheet of glass as it is drawn upward.

While it is believed that from the foregoing description, the nature and advantages of the invention will be readily apparent, we desire to have it understood that what is herein shown and described is merely illustrative of one embodiment of the invention to which we do not limit ourselves and that such changes may be resorted to when desired as fall within the scope of what is claimed.

Having thus described our invention what we claim as new is:—

1. In a machine for manufacturing sheet glass, a furnace, means for drawing the molten glass from the furnace, water jackets arranged immediately above the molten mass and at the opposite sides of the furnace, said jackets being designed to receive the edges of the sheet in a manner whereby the edges are cooled and hardened, and also thickened so as the sheet glass lying between the edges is afforded straightness and uniformity in width, and a water inlet and outlet for each jacket.

2. In a machine for manufacturing sheet glass, a furnace, means for drawing the molten glass from the furnace, doubled walled water jackets arranged at each side of the furnace immediately above the molten mass, said jackets being cylindrical in formation in cross section and longitudinally slotted to receive the adjacent edges of the sheet as it is drawn from the molten mass to preserve straightness and uniformity in width from said sheet, and a water inlet and an outlet for each jacket.

In testimony whereof we affix our signatures.

ORLAN P. MARCONET.
WILLIAM O. CARTER.